United States Patent
Koenig (10) Patent No.: US 6,953,417 B2
(45) Date of Patent: Oct. 11, 2005

(54) METHOD FOR CONTROLLING A DUAL CLUTCH TRANSMISSION

(75) Inventor: Melissa Koenig, Howell, MI (US)

(73) Assignee: BorgWarner Inc., Auburn Hills, MI (US)

( * ) Notice: Subject to any disclaimer, the term of this patent is extended or adjusted under 35 U.S.C. 154(b) by 102 days.

(21) Appl. No.: 10/715,033

(22) Filed: Nov. 17, 2003

(65) Prior Publication Data
US 2005/0107214 A1 May 19, 2005

(51) Int. Cl.⁷ ............................................. B60K 41/02
(52) U.S. Cl. ..................................... 477/181; 477/906
(58) Field of Search ............. 477/181, 906; 701/62–3; 74/340, 346

(56) References Cited

U.S. PATENT DOCUMENTS

| | | | |
|---|---|---|---|
| 3,589,483 A | 6/1971 | Smith | 192/3.52 |
| 4,461,188 A | 7/1984 | Fisher | 74/330 |
| 4,513,631 A | 4/1985 | Koivunen | 74/360 |
| 4,544,057 A | 10/1985 | Webster et al. | 192/0.076 |
| 4,827,784 A | 5/1989 | Muller et al. | 74/330 |
| 4,957,016 A * | 9/1990 | Amedei et al. | 74/340 |
| 5,662,198 A | 9/1997 | Kojima et al. | 192/87.11 |
| 5,711,409 A | 1/1998 | Murata | 192/87.11 |
| 5,720,203 A | 2/1998 | Honda et al. | 74/325 |
| 5,851,164 A * | 12/1998 | Habuchi et al. | 477/906 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,145,398 A | 11/2000 | Bansbach et al. | 74/335 |
| 6,286,381 B1 | 9/2001 | Reed, Jr. et al. | 74/336 |
| 6,364,809 B1 | 4/2002 | Cherry | 477/86 |
| 6,752,743 B2 * | 6/2004 | Eich et al. | 477/906 |

FOREIGN PATENT DOCUMENTS

GB 2 036 203 A 11/1980

* cited by examiner

*Primary Examiner*—Roger Pang
(74) *Attorney, Agent, or Firm*—Bliss McGlynn, P.C.; Greg Dziegielewski (57) ABSTRACT

A method of controlling the hydraulic actuation of the clutches and the synchronizers in a dual clutch transmission in the event of a clutch or synchronizer fault. The method includes the steps of determining which clutch is faulted when a clutch-on fault is detected, then commanding an interruption of engine torque to the faulted clutch and a neutralization of all synchronizers of the same axis shaft as the faulted clutch. The method further senses if a synchronizer actuator-on fault has occurred, then determines which synchronizer is faulted if an actuator-on fault has is detected. The method steps further include preventing the further actuation of the other synchronizers on the same axis shaft as the faulted actuator.

13 Claims, 5 Drawing Sheets

METHOD FOR CONTROLLING A DUAL CLUTCH TRANSMISSION

BACKGROUND OF THE INVENTION

1. Field of the Invention

The present invention relates, generally to the control of a dual clutch transmission and, more specifically, to a method for controlling the hydraulic actuation of the clutches and the synchronizers in a dual clutch transmission in the event of a clutch or synchronizer fault.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch that engages and disengages the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. One disadvantage of the manual transmission is that there is an interruption in the drive connection during gear shifting. This results in losses in efficiency. In addition, there is a great deal of physical interaction required on the part of the operator to shift gears in a vehicle that employs a manual transmission.

The second, and newer choice for the transmission of power in a conventional motor vehicle is an automatic transmission. Automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween. In addition, automatic transmissions are typically more mechanically complex and therefore more expensive than manual transmissions.

For example, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel that is generally considered to be unacceptable when compared to smooth shift feel associated with most conventional automatic transmissions.

To overcome this problem, other automated manual type transmissions have been developed that can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 4, 2000 to Reed, Jr. et al for an Electro-mechanical Automatic Transmission having Dual Input Shafts. These particular types of automated manual transmissions have two clutches and are generally referred to simply as dual, or twin, clutch transmissions. The dual clutch structure is most often coaxially and cooperatively configured so as to derive power input from a single engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission requires a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. Conventional control schemes and methods have generally failed to provide this capability. Accordingly, there exists a need in the related art for better methods of controlling the operation of dual clutch transmissions.

One particular area of improvement that is needed is in the control of the hydraulic actuation of the clutches and synchronizers if a fault occurs. Current control methods have the general capability to engage and disengage the synchronizers as needed. Additionally, they are capable of disabling certain functions of the dual clutch transmission to avoid a damaging "gearbox tie-up" condition when either a clutch or an individual synchronizer remains engaged when commanded to release. However, they lack the ability to adapt the operation of the dual clutch transmission in deference to the type of fault that occurs. Current control methods simply disable the hydraulic feed to the entire faulted axis regardless if either a "clutch-on" fault or a synchronizer "actuator-on" fault occurs. In other words, the fault response to a clutch that remains in the engaged position when commanded to release is the same as the fault response when a particular actuator, and thus a synchronizer, remains in the engaged position when commanded to release. In the event of a "clutch-on" fault, the hydraulic feed to the faulted clutch is disabled. This also concurrently disables the hydraulic feed to the synchronizers on the same axis as the faulted clutch. More precisely, if the odd clutch that engages for first, third, and fifth gear has a clutch-on fault, for example, then the hydraulic feed to the odd clutch and the hydraulic feed to the synchronizers for first, third and fifth gear engagement is disabled. Then, the dual clutch transmission only operates in second, fourth, and sixth gears. This provides a limited "limp-home" mode in which controlled engine torque interrupt and rough changes between the even gears would allow the vehicle some continued mobility. This is a drastic, but necessary measure in response to a "clutch-on" fault. However, this is a drastic and unnecessary approach in response to an "actuator-on" fault, especially considering that the great majority of stuck engagement type faults are actuator and synchronizer related rather than clutch related. In the event of the more common "actuator-on" fault, the faulted actuator holds a gear set engaged and it would still be available for use if the entire axis were not hydraulically disabled. Thus, the manner in which conventional dual clutch transmission control methods respond to faults and control the transmission's hydraulic circuit is limited. Further, current control methods lack the ability to provide for different types of control over the transmission in response to the distinctly different clutch-on fault and actuator-on fault. Accordingly, there remains a need in the art for a control method that operatively and actively controls the hydraulic circuit of the dual clutch transmission in the event of an engagement fault and provides separate control methods in relation to the differences between a clutch-on, and an actuator-on fault.

SUMMARY OF THE INVENTION

The disadvantages of the related art are overcome by the method of the present invention for controlling the hydraulic actuation of the clutches and the synchronizers in a dual clutch transmission in the event of a clutch or synchronizer fault. The method includes the steps of determining which clutch is faulted when a clutch-on fault is detected, then commanding an interruption of engine torque to the faulted clutch and a neutralization of all synchronizers of the same axis shaft as the faulted clutch. The method further senses if a synchronizer actuator-on fault has occurred, then determines which synchronizer is faulted if an actuator-on fault has is detected. The method steps further include preventing the further actuation of the other synchronizers on the same axis shaft as the faulted actuator.

Thus, the present invention overcomes the limitations of the current clutch-on and actuator-on fault response by providing a control method that separately deals with the differences between the clutch and synchronizer actuator fault types and avoids a complete shut down of one of the axis of the transmission in response to an actuator-on fault. In addition, the method of the present invention operates with a simplified hydraulic control system for the dual clutch transmission that utilizes a different routing of the hydraulic pressure lines and provides a reduction in the complexity of the hydraulic system and a reduction in the number of required components.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
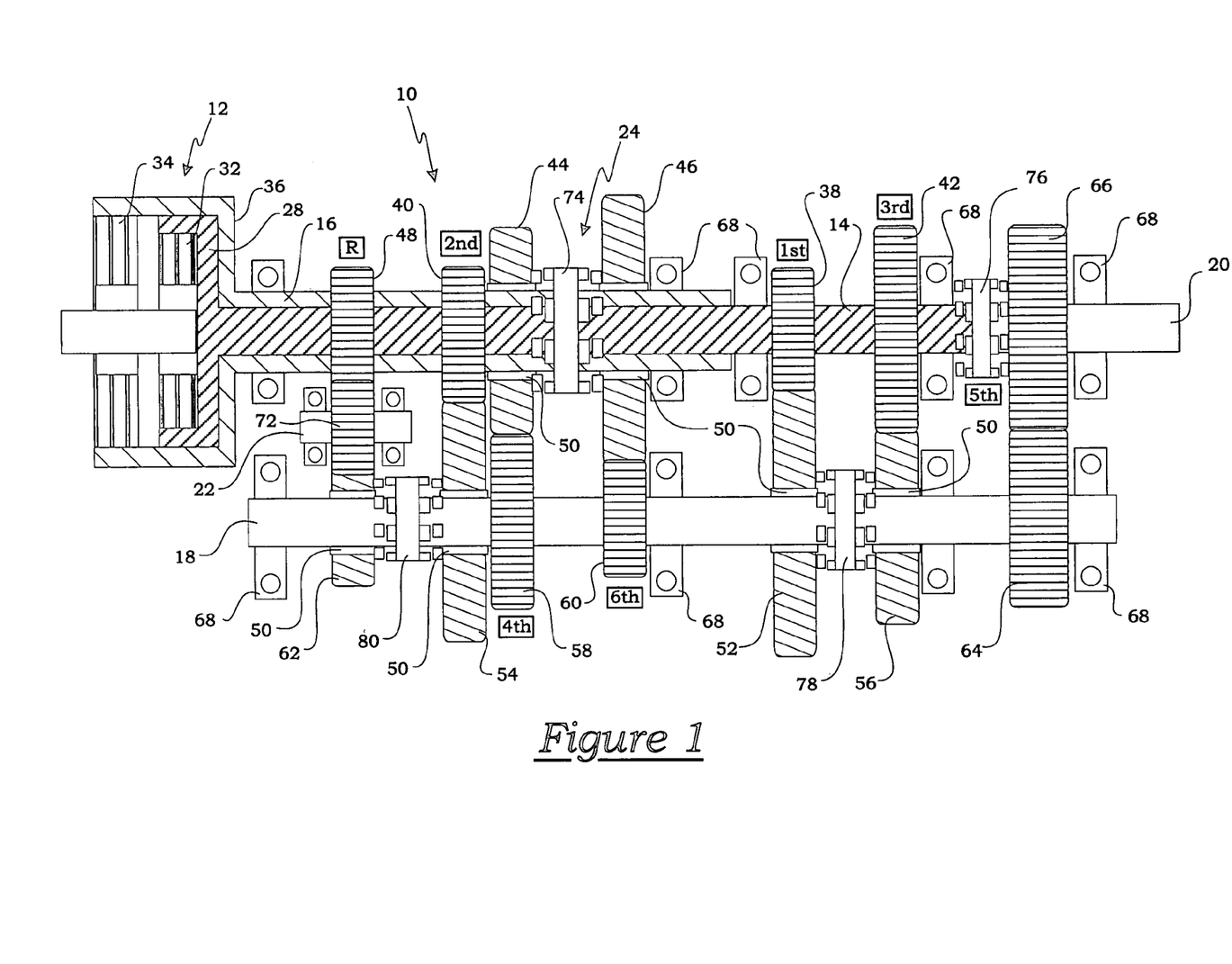
FIG. 1 is a generalized schematic illustration of a dual clutch transmission of the type that may be controlled by the method of the present invention.
Figure 2:
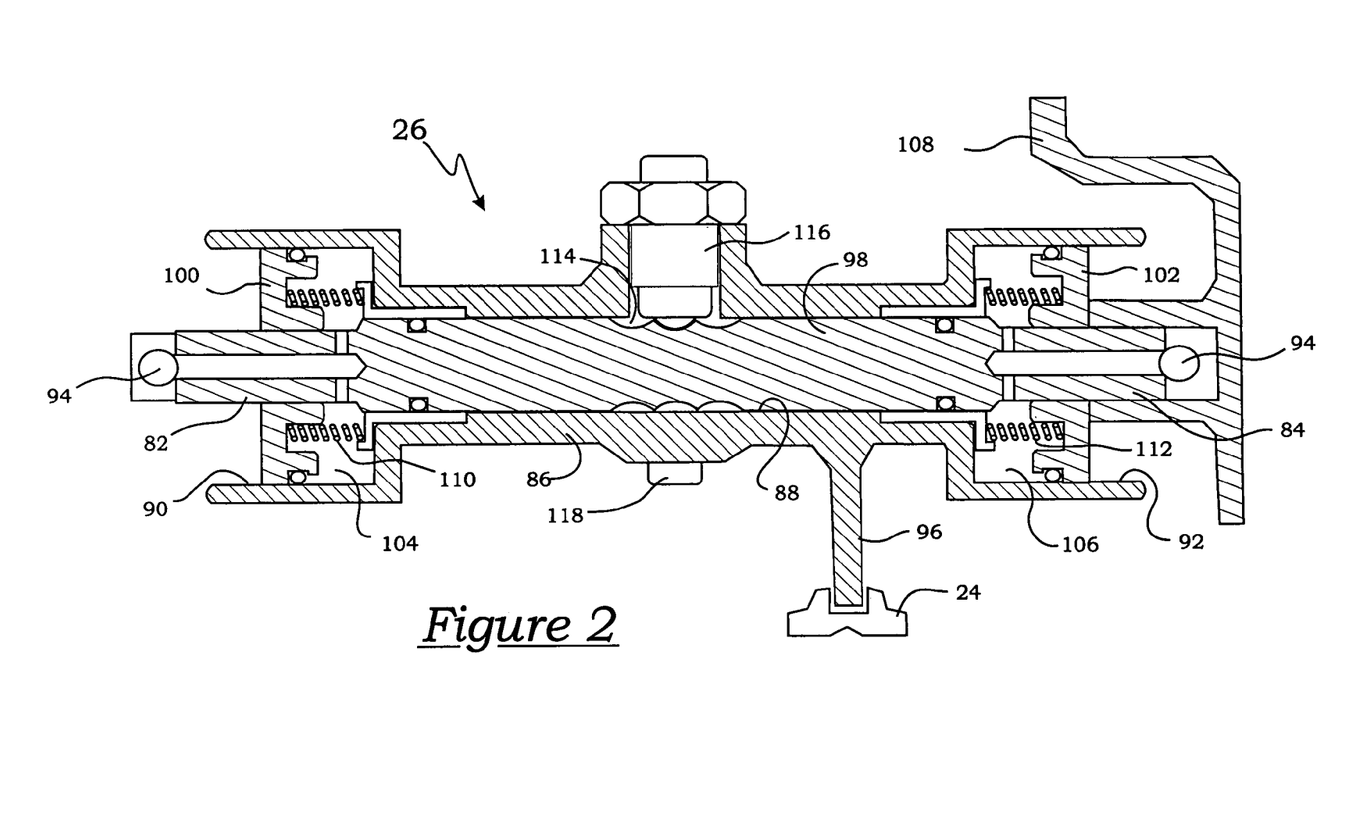
FIG. 2 is an cross-section side view of a hydraulically actuated shift actuator of a dual clutch transmission of the type that may be controlled by the method of the present.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly supported on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

The counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and sixth counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

The reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off of a center neutralized position to the right and engage another gear to its respective shaft when moved to the left. Specifically with reference to the example illustrated in FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76. It should be appreciated that this example of the dual clutch transmission is representative and that other gear set, synchronizer, and shift actuator arrangements are possible within the dual clutch transmission 10 as long as the even and odd gear sets are disposed on opposite input shafts.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIG. 2, the shift actuators 26 are essentially two way or dual hydraulic valve assemblies that are driven back and forth linearly, in parallel to one of the input shafts 14, 16 or the counter shaft 18, to move a shift fork 96, and ultimately one of the plurality of synchronizers 24 in and out of engagement. The hydraulically operated shift actuators 26 include an outer case 86 that includes a main bore 88 having two cylindrically shaped open ends 90, 92. A shift fork 96 is formed as part of the outer case 86 and extends radially outwards to engage a synchronizer that is disposed on one of the transmission shafts. A main shaft 98 is slidably disposed within the main bore 88 of the outer case 86. The main shaft 98 includes two opposing ends 82 and 84 upon which two piston 100, 102 are fixedly disposed, respectively. The pistons 100, 102 are moveable with respect to the cylindrically shaped open ends 90, 92 of the outer case 86. The interaction of each piston 100, 102 within its respective cylinder end 90, 92 forms an expansion chamber 104, 106. One of the ends 84 of the main shaft 98 is fixed to the body of the transmission 108. In this manner, the outer case 86 and shift fork 96 move relative to the fixed main shaft 98 so that the shift fork 96 will cause the synchronizer 24 to be moved. To affect movement of the outer case 86, the shifter fork 96, and thus the synchronizer 24, hydraulic fluid is selectively delivered under pressure to either one of the expansion chambers 104, 106 through the fluid passages 94.

When hydraulic pressure is applied to expansion chamber 104, the pressure acts against piston 100 and the cylinder shaped end 90 of the outer case 86 causing the outer case 86 and the shifter fork 96 to move to the right, as illustrated. When hydraulic pressure is applied to expansion chamber 106, the pressure acts against piston 102 and the cylinder shaped end 92 of the outer case 86 causing the outer case 86 and the shifter fork 96 to move to the left. The expansion chambers 104, 106 also contain biasing members 110, 112 such as springs, which assist in returning the outer case 86 to its center, thereby urging the outer case 86 and the shifter fork 96 to its neutral position. It should be appreciated that when disengaging a synchronizer 24 from an engaged position, the hydraulic pressure that was applied to actuate the shift actuator 26 to the current engagement position is removed and the opposing expansion chamber may be charged with enough pressure and for sufficient time to move the shift actuator 26 back to a neutralized position rather than relying solely on the biasing force of the biasing member. The main shaft 98 also includes a set of circumferential grooves 114, which work cooperatively with a spring loaded ball assembly, generally indicated at 116, disposed upon the outer case 86 to provide detent positioning and serve as positive locating points for the movement of the shift actuator 26. The outer case 86 also includes an externally mounted position sensor 118 that is used to monitor the position of the outer case 86 relative to the fixed main shaft 98 so that the actual position of the synchronizer 24 is always known.

Figure 3:
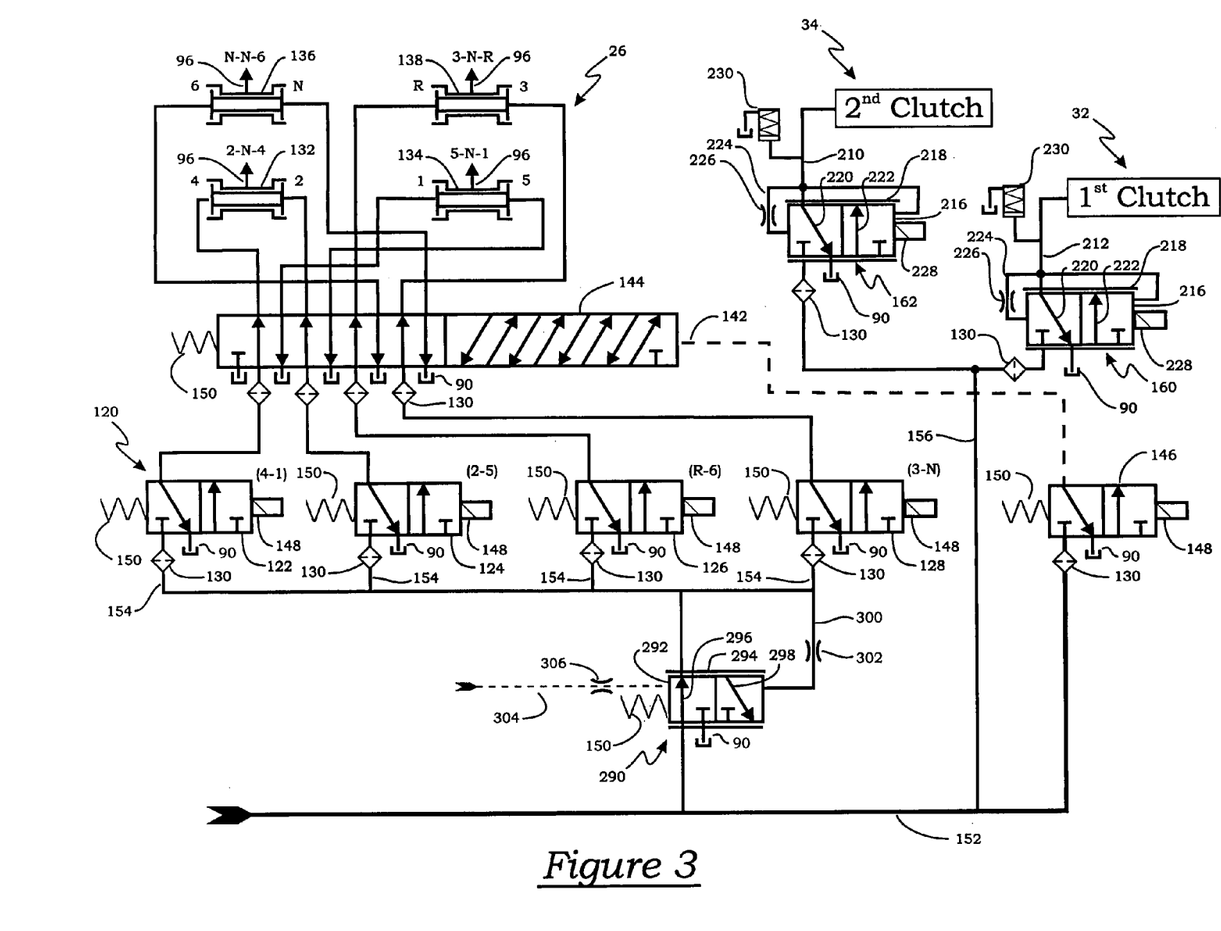
FIG. 3 is a schematic illustration of one example of a electro-hydraulic control circuit for the shift actuators and clutch actuators of a dual clutch transmission of the type that may be controlled by the method of the present invention.

The application of hydraulic pressure to the shift actuators 26 is operatively controlled by actuator solenoids, generally indicated at 120 in FIG. 3. The actuator solenoids 120 and shift actuators 26 are schematically represented. In this figure, all the actuator solenoids 120 are illustrated in the de-energized position. For clarity, the synchronizers 24 are not illustrated in FIG. 3 and the shift forks 96 are depicted as arrows extending from the shift actuators 26. As previously mentioned, each of the shift actuators 26 are dual hydraulic assemblies operatively moving a two sided synchronizer 24 to engage their respective gear sets. As shown in FIG. 3 with respect to this example of a dual clutch transmission 10, there are four actuator solenoids 122, 124, 126, and 128 that control the four shift actuators 132, 134,

136, and 138. Thus, each actuator solenoid 120 must provide pressure to both expansion chambers 104, 106 (left and right) for each shift actuator 26 to cause it to engage the synchronizers 24 in both directions. To this end, the actuator solenoids 120 are multiplexed (i.e., used for more than one operation) through the use of a multiplex valve 144. The multiplex valve 144 is controlled by a multiplex solenoid 146, which applies hydraulic pressure through line 142 to activate the multiplex valve 144 to the left, as illustrated. Through the multiplex valve 144, each actuator solenoid 120 provides the hydraulic pressure for two shift movements. The actuator solenoids 120 and the multiplex solenoid 146 are electrically controlled by the ECU through the application and interruption of a voltage to the coil assemblies 148 of the individual solenoids. The solenoids 120 and 146 have biasing members 150 that return the valve member to its normally closed position when de-energized, as shown in FIG. 3.

The first and second clutch mechanisms that operate the first and second clutches are generally indicated at 32 and 34 in FIG. 3. The clutch mechanisms 32, 34 are operatively engaged and disengaged in a coordinated manner relative to the actuation of the various gear sets by the shift actuators 26 to selectively transfer torque through a particular gear set to the output shaft 20 of the transmission 10. By way of example, if torque is being transferred to the drive wheels of the vehicle to initiate movement from a standing start, the lowest, or first, gear ratio of the dual clutch transmission 10 will likely be engaged. Therefore, as shown in FIG. 1, synchronizer 78 will be driven to the left to engage the first counter gear 52 to the counter shaft 18 and the first clutch mechanism 32 will be engaged to transfer torque from the engine to the output shaft 20 through the first gear set. When vehicle speed increases and the ECU determines that the conditions require a shift to the second gear set, synchronizer 80 will first be driven to the right to engage the second counter gear 54 to the counter shaft 18. Then the second clutch mechanism 34 will be engaged as the first clutch mechanism 32 is disengaged. In this manner, a powershift, where no power interruption occurs, is affected. Additionally, while engaged and driving a particular gear, the first and second clutch mechanisms 32 and 34 are controlled by certain stored routines that provide varying amounts of engagement force to the clutch discs and thereby operatively control the amount of torque transferred across the clutches and the resultant engine speed.

With continuing reference to FIG. 3, the first and second clutch mechanisms 32 and 34 of the dual, coaxial clutch assembly 12 are actuated by hydraulic pressure supplied by the first and second clutch actuator solenoids, which are schematically represented, and generally indicated at 160 and 162, respectively. The clutch actuator solenoids 160 and 162 are in fluid communication with the clutch mechanisms 32 and 34 through clutch pressure lines 210 and 212 respectively. Each of the clutch actuator solenoids 160 and 162 has a selectively movable valve member 216 disposed within a valve body 218 that has internal hydraulic flow passages 220 and 222. The clutch actuator solenoids 160 and 162 also have external hydraulic feedback passages 224, which feed both sides of the valve member 216 on differential areas. The feed to the left side of the valve member has a restrictor 226 installed to dampen the feedback a predetermined amount. A solenoid 228 selectively drives the valve member 216 operatively from its de-energized position biased to the left as illustrated in FIG. 3 to its energized position which allows the flow of pressurized hydraulic fluid to flow through internal passages 222 out the clutch pressure line 210, 212 to the clutch 32, 34.

The clutch actuator solenoids 160 and 162 are current controlled, variable regulating valves such that a given control current applied to solenoids 228 will result in a particular pressure output in the clutch pressure lines 210, 212. Regulation of the clutch actuator solenoids 160, 162 is further provided by the pressure feedback through passages 224. The clutch actuator solenoids 160 and 162 have internal passages 220 to send residual pressure from the clutch pressure lines 210 and 212 back to the sump 90 when the solenoid is de-energized. Additionally, return valves 230 are used as dampers.

To operate the actuator solenoids 120 in the example illustrated in FIG. 3, the following events must occur. When first gear is selected, there is no direct path through the multiplex valve 144, so the multiplex solenoid 146 must be energized first to open a hydraulic path to allow actuator solenoid 122 to pressurize the left side of shift actuator 134. This moves shift actuator 134 to the right so that the shifter fork 96 moves the appropriate synchronizer into first gear engagement. When engaging second gear, the multiplex solenoid 146 must be de-energized first to allow the multiplex valve 144 to move back to the left to open a hydraulic path for actuator solenoid 124 to pressurize the right side of shift actuator 132 causing shift actuator 132 to move to the left so that the shifter fork 96 moves the appropriate synchronizer into second gear engagement. It should be appreciated that the disengagement of the synchronizers 24 and thus the neutralization of an engaged gear set is accomplished by actuating the opposing side of the respective shift actuator 26. This opposing, neutralizing actuation of the shift actuator 26 is only to the point of moving the shift fork 96 and respective synchronizer to the neutral and disengaged position without continuing the actuation to a full engagement of the opposing gear set. Thus, to disengage first gear, once the shift to second is completed multiplex solenoid 142 is energized to allow actuator solenoid 124 to charge the hydraulic fluid path to the right side of shift actuator 134 causing shift actuator 134 to move to the left so that the shifter fork 96 moves the synchronizer out of first gear engagement to the neutral position.

Therefore, in the representative example illustrated in FIG. 3, through the use of the multiplex valve 144, actuator solenoid 122 controls the shifts into either fourth or first gear, as well as the neutralization of second or fifth. Actuator solenoid 124 controls the shifts into second or fifth gear, as well as the neutralization of fourth or first. Actuator solenoid 126 controls the shifts into either reverse or sixth gear, as well as the neutralization of third. Actuator solenoid 128 controls the shifts into third gear, as well as the neutralization of reverse or sixth. In this representative example, there are four solenoids and a multiplex valve allowing eight possible actuation combinations for this six-speed transmission with reverse. Only seven of the eight combinations are used. Thus, actuator solenoid 126 only has to neutralize one gear set and actuator solenoid 128 only has to engage one gear set. It should be appreciated that the arrangement of the gear sets, the synchronizers, and the shift actuators within the dual clutch transmission may be application driven such that any relative arrangement of these components is possible as long as the even gear sets are on one axis and the odd gear sets are on the other axis.

It should be further appreciated that the operation of the dual clutch transmission 10 is managed by some type of control device such as an electronic control unit (ECU) that oversees the functioning of the transmission 10, or by an electronic control unit for the vehicle in which the dual clutch transmission 10 may be installed. Regardless, there exists a control device, beyond the scope of this invention, that controls and operates the dual clutch transmission through a stored control scheme or series of control schemes of which the present invention is merely a part. The control device having the capability of providing the proper voltages, signals, and/or hydraulic pressures to operate the transmission 10 and particularly the clutch engagement functions. Thus, the control method of the present invention as described below is merely a portion, such as a subroutine, or series of sub-routines, of a larger control scheme within the ECU.

During operation, the slip across the clutches 32 and 34 is monitored by higher level control methods. Similarly, the shift actuator 26 positions are also monitored. If it is determined that a clutch remains engaged (closed) when it has been commanded to be disengaged (open) then a "clutch-on" fault has occurred. A clutch-on fault will result in damage to the transmission (i.e. a gear-box tie-up) and possible loss of control to the vehicle if the other clutch is engaged. If it is determined that a shift actuator remains in a particular gear engagement position when it has been commanded to its neutral position or into the opposite side gear engagement then an "actuator-on" fault has occurred. An actuator-on fault will result in damage to the transmission synchronizers if another synchronizer on the same axis in engaged.

The response of current control methods to the occurrence of either a clutch-on or an actuator-on fault is to turn off the hydraulic pressure feed to the entire axis. Turning off either axis in this manner will prevent damage to the transmission and avoid other problems but limits the vehicle to either the even or the odd set of gears in a severely restricted limp-home mode. These current control methods are employed with hydraulic circuits of dual clutch transmissions that have two separate pressure regulator circuits. Each regulator circuit controls the hydraulic feed pressure to one of the clutch actuators and the feed pressure to the actuator solenoids for the same axis. Thus, in response to either a clutch-on or an actuator-on fault the current control methods simply turn off the respective pressure regulator to the faulted axis. In the case of a clutch-on fault, the only viable solution to prevent further problems is to disable the respective axis. However, with the more common actuator-on fault it is unnecessary to completely disable the axis with the faulted actuator. With actuator-on faults, the engaged gear that is stuck on may still be successfully used to drive the vehicle and it is not necessary to completely disable the axis.

The present invention overcomes the limitations in the responses of current control methods in the event of clutch-on and actuator-on faults by providing a control method that separately deals with the differences between a clutch-on fault and an actuator-on fault. Thus, the present invention avoids a complete shut down of one of the faulted axis of the transmission in response to an actuator-on fault. To accomplish this, the method of the present invention is not employed with a dual clutch hydraulic circuit having two separate axis pressure regulators as used with current control methods. The method of the present invention is employed with the example of a hydraulic circuit for a dual clutch transmission as illustrated in FIG. 3, which uses a single regulator valve 290. Regulator valve 290 provides the operative hydraulic pressure to the actuator solenoids 122, 124, 126, and 128. The clutch actuators 160 and 162 are directly supplied with "line" hydraulic pressure as supplied from the pump (not shown) through hydraulic lines 152 and 156.

Regulator valve 290 has a valve member 292 slidingly disposed within a valve body 294. The valve member 292 has internal flow passages 296 and 298. The regulator valve 290 further includes a bias spring 150 that causes the valve member 292 to be normally open to the right as illustrated in FIG. 3. In this manner, "line" hydraulic pressure as supplied from the pump (not shown) through hydraulic line 152 passes through internal flow passage 294 to charge the lines 154 to the actuator solenoids 122, 124, 126, and 128. The regulator valve 290 has a feed back line 300 with a restrictor 302 to influence the right side of the valve member 292 on a differential area. Additionally, regulated line (solenoid output) pressure is supplied through hydraulic line 304 and a restrictor 306 to influence the left side of the valve member 292. It should be appreciated that the feedback pressure from line 300 and the regulated line pressure from line 304 are generally predetermined through the sizing of the restrictors 302 and 306 to provide an operational range of output pressure and flow from the regulator valve 290. Additionally, the fluid communication between the actuator solenoids 122, 124, 126, and 128 and the shift actuators 132, 134, 136, and 138 is hydraulically routed so that each actuator solenoid, through the multiplex valve 144, serves one even and one odd gear set. This allows for better neutralization of the same axis synchronizers when an actuator-on fault occurs.

Figure 4:
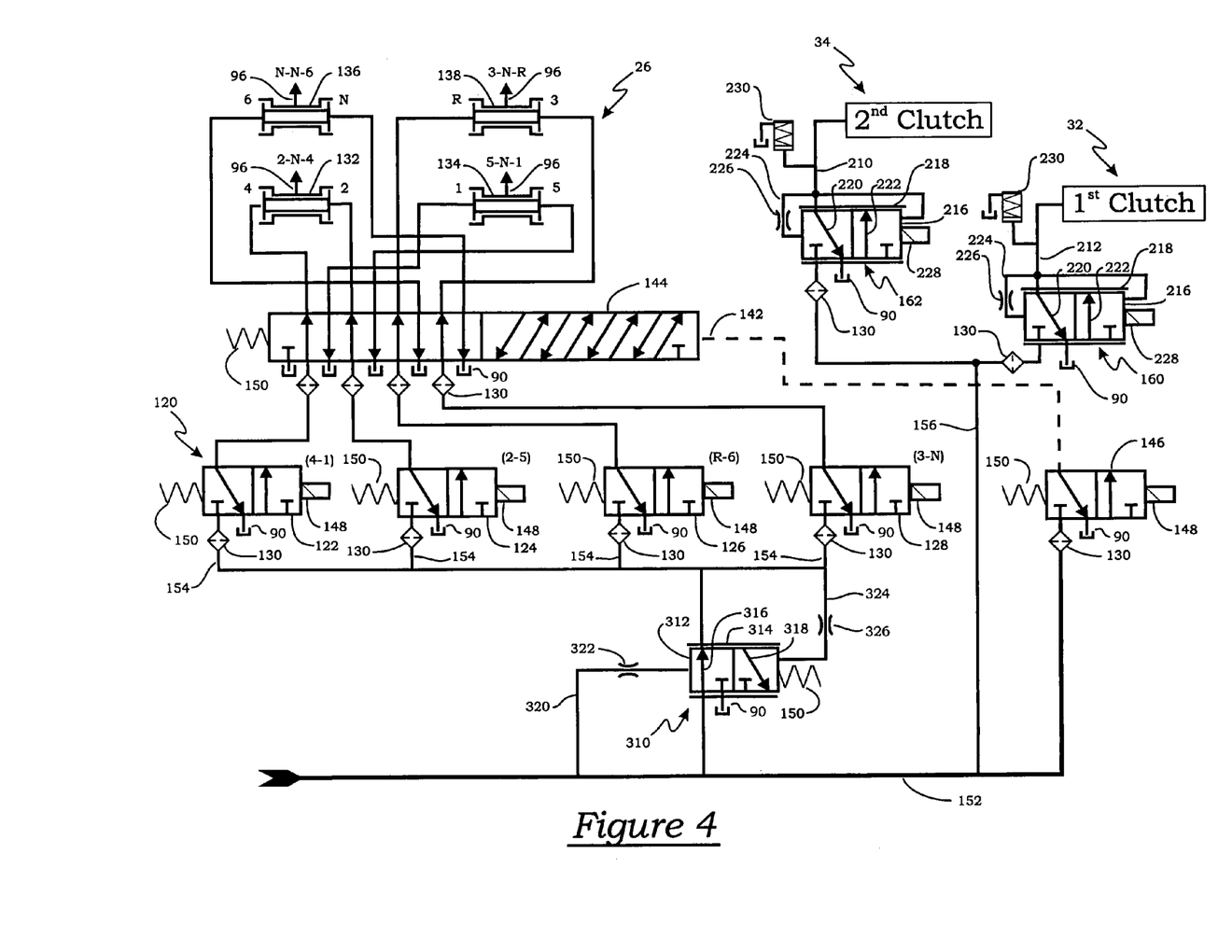
FIG. 4 is a schematic illustration of another example of a electro-hydraulic control circuit for the shift actuators and clutch actuators of a dual clutch transmission of the type that may be controlled by the method of the present invention.

The method of the present invention may also be employed with another example of a hydraulic circuit for a dual clutch transmission as illustrated in FIG. 4, which uses a single regulator valve 310. Regulator valve 310 includes a valve member 312 slidingly disposed in a valve body 314. The valve member 312 has internal flow passages 314 and 316. The regulator valve 310 further includes a bias spring 150 that causes the valve member 312 to be normally closed to the left as illustrated. Line hydraulic pressure as supplied from the pump (not shown) through hydraulic line 152 is provided through a feed line 320 and a restrictor 322 to the left side of the valve member 312 as illustrated to cause the valve to be open when line pressure is present. In this manner, line hydraulic pressure is passed through internal flow passage 314 to charge the lines 154 to the actuator solenoids 122, 124, 126, and 128. The regulator valve 310 has a feed back line 324 with a restrictor 326 and a bias spring 150 to influence the right side of the valve member 312 on a differential area. Thus, it should be appreciated that the feedback pressure from line 324, and the line pressure from line 322 are generally predetermined through the sizing of the restrictors 322 and 326 to provide an operational range of output pressure and flow from the regulator valve 310.

Furthermore, the method of the present invention does not control hydraulic output of the various components by simply disabling the hydraulic feed to the faulted axis as does the current control methods. The method of the present invention selectively controls the hydraulic pressure output from the clutch actuators 160 and 162 and from the actuator solenoids 122, 124, 126, and 128 by electrical control of the clutch actuators and actuator solenoids. To provide control of the hydraulic circuits of the dual clutch transmission when a fault occurs, the method of the present invention first determines which clutch is faulted when a clutch-on fault is detected. Then the method commands an interruption of engine torque to the faulted clutch and neutralization of all synchronizers of the same axis shaft as the faulted clutch. The method further determines if a synchronizer actuator-on fault has occurred, then determines which synchronizer is faulted if an actuator-on fault is detected. Finally, the method prevents the further actuation of the other synchronizers on the same axis shaft as the faulted actuator.

Figure 5:
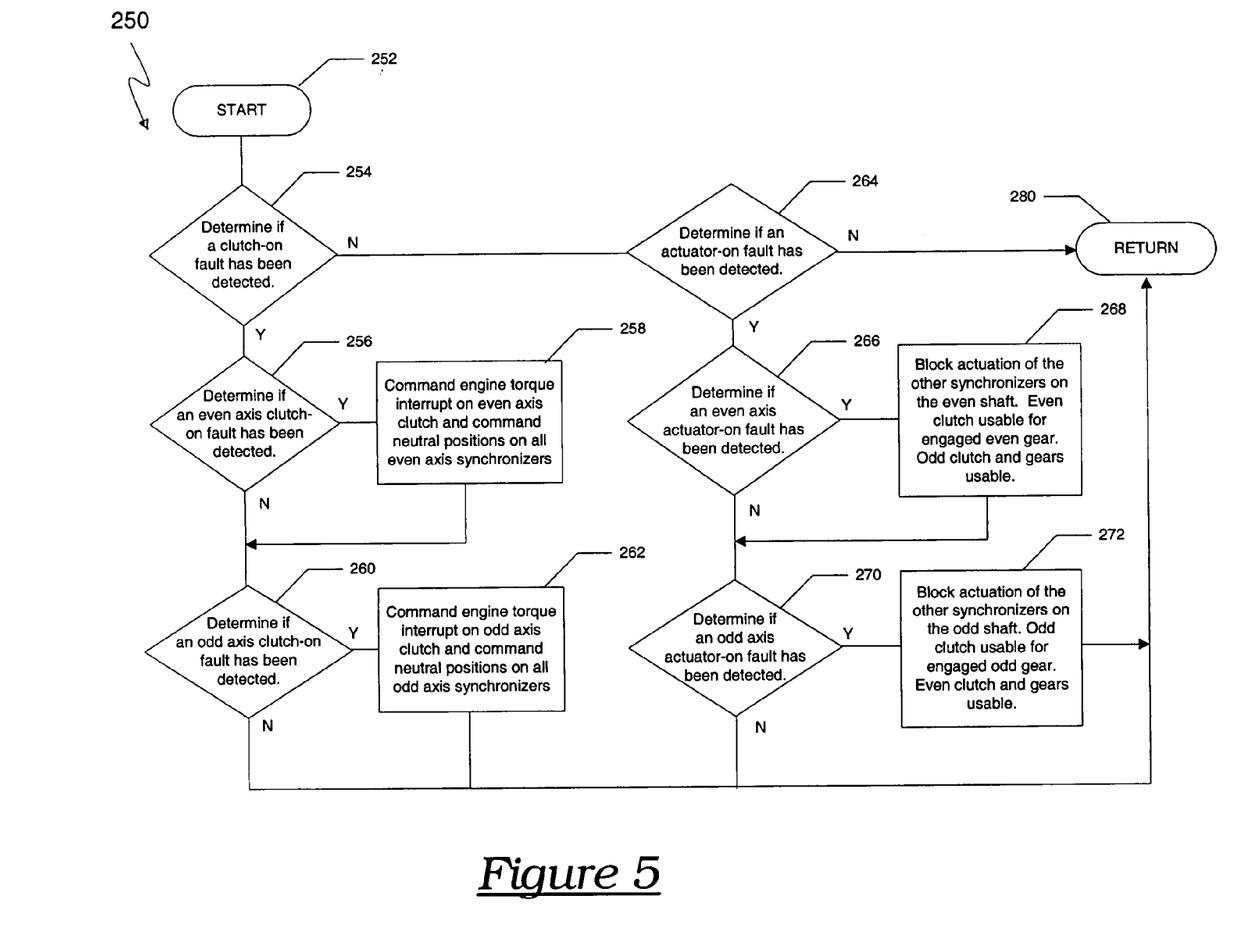
FIG. 5 is a block diagram flowchart of the method of the present invention for controlling the hydraulic actuation of the clutches and the synchronizers in a dual clutch transmission in the event of a clutch or synchronizer fault.

More specifically, the method of the present invention will be described with reference to the flow chart generally indicated at 250 in FIG. 5. It should be appreciated that the method steps of the present invention are cyclical and are constantly running within, or under a higher level control method. The method steps of the present invention are first initiated at the "START" entry block 252 of FIG. 5. Decision block 254 then determines if a clutch-on fault has been detected. If a clutch-on fault has not been detected, the "No" path is taken to decision block 264. If a clutch-on fault has been detected, the "Yes" path is taken to decision block 256, which further determines if an even axis clutch-on fault has been detected. If the clutch-on fault is an even axis clutch-on fault, then the "Yes" path is taken to process block 258. Process block 258 causes the ECU to command an interruption of the transfer of engine torque across the even axis clutch and to command all even axis synchronizers be moved to their neutral positions.

When the actions of process block 258 are completed or if decision block 256 determines that the clutch-on fault did not occur on the even axis clutch (the "No" path), the method continues at decision block 260 to determine if an odd axis clutch-on fault has occurred. If decision block 260 determines that an odd axis clutch-on fault has occurred, then the "Yes" path is taken to process block 262. Process block 262 causes the ECU to command an interruption of the transfer of engine torque across the odd axis clutch and to command all odd axis synchronizers be moved to their neutral positions. When the actions of process block 262 are completed or if decision block 260 determines that the clutch-on fault did not occur on the odd axis clutch (the "No" path), the method restarts through return block 280.

As mentioned above, if decision block 254 determines that a clutch-on fault has not occurred and the "No" path is taken to decision block 264, decision block 264 will determine if an actuator-on fault has occurred. If no actuator-on fault is detected, the "No" path is followed to the return block 280 to restart the method steps. If an actuator-on fault is present, then the "Yes" path is taken to decision block 266 to determine if it is an even axis actuator-on fault. If the actuator-on fault is an even actuator-on fault, then the "Yes" path is taken to process block 268. Process block 268 causes the ECU to block further actuation of the other synchronizers on the even axis input shaft. This will allow the even axis clutch to be usable when conditions warrant the use of the gear set that is engaged by the stuck actuator. Additionally, the odd axis clutch and gears will remain fully usable.

When the actions of process block 268 are completed or if decision block 266 determines that the actuator-on fault did not occur on the even axis clutch (the "No" path), the method continues at decision block 270 to determine if an odd axis actuator-on fault has occurred. If decision block 270 determines that an odd axis actuator-on fault has occurred, then the "Yes" path is taken to process block 272. Process block 272 causes the ECU to block further actuation of the other synchronizers on the odd axis input shaft. This will allow the odd axis clutch to be usable when conditions warrant the use of the gear set that is engaged by the stuck actuator. Additionally, the even axis clutch and gears will remain fully usable. When the actions of process block 272 are completed or if decision block 270 determines that the actuator-on fault did not occur on the odd axis clutch (the "No" path), the method restarts through return block 280. In this manner, it should be appreciated that the method of the present invention is a cyclical and dynamic process such that the method steps are continuously repeated. Thus, there is a continuous re-determining if a clutch-on fault has been detected and if an actuator-on fault has been detected. It should be further appreciated that the determination of whether a clutch-on or actuator-on fault has occurred may be a simple reference to the determinations of a higher level control method or may be a separate determination of input values by this method through dedicated sensors or through the monitoring of common sensor data. Thus, the method of the present invention overcomes the drawbacks and the limitations of the prior art by providing a control method that separately deals with the differences between clutch-on and actuator-on fault types and avoids a complete shut down of one of the axis of the transmission in response to an actuator-on fault.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

I claim:

1. A method of controlling the engagement of clutches and synchronizers of a dual clutch transmission in the event of a clutch or synchronizer fault, said method includes the steps of:
   determining which clutch is faulted when a clutch-on fault is detected;
   commanding an interruption of engine torque to the faulted clutch;
   commanding neutralization of all synchronizers of a same axis shaft as the faulted clutch;
   determining which synchronizer is faulted if an actuator-on fault has is detected; and
   preventing the further actuation of the other synchronizers on the same axis shaft as the faulted actuator.

2. A method as set forth in claim 1 wherein the method further includes the steps of:
   continuously re-determining if a clutch-on fault has been detected; and
   continuously re-determining if an actuator-on fault has been detected.

3. A method as set forth in claim 2 wherein the method step of continuously re-determining if a clutch-on fault has been detected further includes the step of referring to a higher level control method to sense if the higher level control method has determined if a clutch-on fault has occurred.

4. A method as set forth in claim 1 wherein the method step of determining which clutch is faulted when a clutch-on fault is detected further includes the step of referring to a higher level control method to sense which clutch the higher level control method has determined to be faulted.

5. A method as set forth in claim 2 wherein the method step of continuously re-determining if a clutch-on fault has been detected further includes the step of monitoring reference data provided by engine and transmission sensors and comparing the data to a look-up table.

6. A method as set forth in claim 1 wherein the method step of determining which clutch is faulted when a clutch-on fault is detected further includes the step of monitoring reference data provided by engine and transmission sensors and comparing the data to a look-up table.

7. A method as set forth in claim 2 wherein the method step of continuously re-determining if an actuator-on fault has been detected further includes the step of referring to a higher level control method to sense if the higher level control method has determined if an actuator-on fault has occurred.

8. A method as set forth in claim 2 wherein the method step of continuously re-determining if an actuator-on fault has been detected further includes the steps of monitoring reference data provided by engine and transmission sensors and comparing the data to a look-up table.

9. A method as set forth in claim 1 wherein the step of determining which clutch is faulted when a clutch-on fault is detected further includes the steps of:
    determining if an even axis clutch-on fault has been detected; and
    determining if an odd axis clutch-on fault had been detected.

10. A method as set forth in claim 9 wherein the step of commanding an interruption of engine torque to the faulted clutch further includes the steps of:
    commanding an interruption of engine torque to the even axis clutch if the even axis clutch is faulted; and
    commanding an interruption of engine torque to the odd axis clutch if the odd axis clutch is faulted.

11. A method as set forth in claim 1 wherein the step of commanding neutralization of all synchronizers of the same axis shaft as the faulted clutch further includes the steps of:
    commanding neutralization of all synchronizers of the even axis shaft when the even axis clutch is the faulted clutch; and
    commanding neutralization of all synchronizers of the odd axis shaft when the odd axis clutch is the faulted clutch.

12. A method as set forth in claim 1 wherein the step of determining which synchronizer is faulted if an actuator-on fault has is detected further includes the steps of:
    determining if an even axis actuator-on fault has been detected; and
    determining if an odd axis actuator-on fault had been detected.

13. A method as set forth in claim 1 wherein the step of preventing the further actuation of the other synchronizers on the same axis shaft as the faulted actuator further includes the steps of:
    preventing the further actuation of the other even axis synchronizers when an even axis actuator has faulted; and
    preventing the further actuation of the other odd axis synchronizers when an odd axis actuator has faulted.

* * * * *